United States Patent
Heidinga et al.

(10) Patent No.: US 10,846,147 B2
(45) Date of Patent: Nov. 24, 2020

(54) CLASS-SPECIFIC SPINLOCK PARAMETERS FOR INCREASED PERFORMANCE

(71) Applicant: International Business Machines Corporation, Armonk, NY (US)

(72) Inventors: Daniel J. Heidinga, Ontario (CA); Angela Lin, Ontario (CA); Babneet Singh, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/340,841

(22) Filed: Nov. 1, 2016

(65) Prior Publication Data
US 2018/0121255 A1    May 3, 2018

(51) Int. Cl.
*G06F 9/52* (2006.01)
*G06F 9/48* (2006.01)

(52) U.S. Cl.
CPC .............. *G06F 9/526* (2013.01); *G06F 9/524* (2013.01)

(58) Field of Classification Search
CPC . G06F 9/256; G06F 9/526; G06F 9/48; G06F 9/4881
See application file for complete search history.

(56) References Cited

U.S. PATENT DOCUMENTS

| | | | | |
|---|---|---|---|---|
| 6,268,850 B1 * | 7/2001 | Ng | ................... | G06F 16/2315 715/866 |
| 6,519,594 B1 * | 2/2003 | Li | ................... | G06F 9/44563 707/704 |
| 8,327,187 B1 * | 12/2012 | Metcalf | ................ | G06F 13/4068 714/10 |
| 8,347,290 B2 | 1/2013 | Srinivasan | | |
| 8,990,823 B2 | 3/2015 | Blythe et al. | | |
| 9,262,233 B1 * | 2/2016 | Reed | .................. | G06F 9/52 |
| 2004/0024797 A1 * | 2/2004 | Berry | ................. | G06F 11/3466 |
| 2005/0081204 A1 * | 4/2005 | Schopp | .................. | G06F 9/526 718/100 |
| 2006/0031658 A1 * | 2/2006 | Swanberg | ............. | G06F 9/3851 712/1 |
| 2012/0198454 A1 | 8/2012 | Dawson et al. | | |
| 2012/0233609 A1 * | 9/2012 | Blythe | ............... | G06F 11/3409 718/1 |
| 2015/0254113 A1 | 9/2015 | Chiang et al. | | |
| 2015/0286586 A1 | 10/2015 | Yadav | | |

OTHER PUBLICATIONS

Dawson, M., JVM updates in WebSphere Application Server V8: Adaptive spinning and the lock nursery, IBM, Nov. 2, 2011, 9 pages.
JLM—Java Lock Monitor, sourceforge.net, p. 1.

* cited by examiner

*Primary Examiner* — Shanto Abedin
*Assistant Examiner* — Bruce S Ashley
(74) *Attorney, Agent, or Firm* — Patterson + Sheridan, LLP (57) ABSTRACT

Techniques are disclosed for providing class-specific parameters for spinlocks in an application executing in a runtime environment. During execution of the application, a blocking portion of code is entered for an object in the application. The runtime environment determines that one or more spinlock parameters is enabled for the object of a class. The runtime environment applies the determined spinlock parameters to the object. A spinlock algorithm is performed using the applied spinlock parameters.

20 Claims, 6 Drawing Sheets

```
typedef struct CustomSpinOptions {
    char* className;
    UDATA thrMaxSpins1BeforeBlocking;
    UDATA thrMaxSpins2BeforeBlocking;
    UDATA thrMaxYieldsBeforeBlocking;
    UDATA thrMaxTryEnterSpins1BeforeBlocking;
    UDATA thrMaxTryEnterSpins2BeforeBlocking;
    UDATA thrMaxTryEnterYieldsBeforeBlocking;
    UDATA defaultMonitorSpinCount1;
    UDATA defaultMonitorSpinCount2;
    UDATA defaultMonitorSpinCount3;
} CustomSpinOptions;
```

CLASS-SPECIFIC SPINLOCK PARAMETERS FOR INCREASED PERFORMANCE

BACKGROUND

The present disclosure relates to object locking, and more specifically, to providing class-specific spinlock parameters in an application executing in a runtime environment.

A spinlock is a synchronization mechanism used in computer programming. Under this approach, a thread attempts to acquire a spinlock by waiting in a loop ("spinning") while continually determining whether the spinlock is available to be acquired. Once acquired, the thread holds onto the spinlock while other threads are blocked from accessing the lock. Generally, spinlocks are efficient in situations where threads are likely to be blocked for short periods due to lack of overhead from computationally expensive operation system process rescheduling and context switching.

A developer may use spin locks in source code of an application. For example, in an object-oriented programming-based language, such as Java, the developer may include lock operations in various classes of the application which is implemented by the spinlock algorithms of the Java runtime. Once compiled, a user can then execute the application via a runtime environment. Generally, runtime environments provide a user interface (e.g., a command line interface) to instantiate different parameters to tune the application. For instance, the user can tune some settings relating to the spinlocks, such as spin thresholds relating to an amount of spins before blocking. The specified settings are then applied globally across the application.

SUMMARY

One embodiment presented herein discloses a method. The method generally includes entering a blocking portion of code for an object in an application during execution of the application in a runtime environment. The method also generally includes determining that one or more spinlock parameters is enabled for the object of a first class of a plurality of classes in the application. The one or more spinlock parameters is associated with the class. Upon determining that the one or more spinlock parameters for the object is enabled, the determined spinlock parameters are applied to the object. A spinlock algorithm is performed using the applied spinlock parameters.

Another embodiment presented herein discloses a computer program product including a computer-readable storage medium storing instructions, which, when executed on a processor, performs an operation. The operation itself generally includes entering a blocking portion of code for an object in an application during execution of the application in a runtime environment. The operation also generally includes determining that one or more spinlock parameters is enabled for the object of a first class of a plurality of classes in the application. The one or more spinlock parameters is associated with the class. Upon determining that the one or more spinlock parameters for the object is enabled, the determined spinlock parameters are applied to the object. A spinlock algorithm is performed using the applied spinlock parameters.

Yet another embodiment presented herein discloses a system including a processor and a memory storing program code, which, when executed on the processor, performs an operation. The operation itself generally includes entering a blocking portion of code for an object in an application during execution of the application in a runtime environment. The operation also generally includes determining that one or more spinlock parameters is enabled for the object of a first class of a plurality of classes in the application. The one or more spinlock parameters is associated with the class. Upon determining that the one or more spinlock parameters for the object is enabled, the determined spinlock parameters are applied to the object. A spinlock algorithm is performed using the applied spinlock parameters.

DETAILED DESCRIPTION

Some runtime environments allow a user to specify spinlock parameters prior to executing an application within the runtime environment. For example, the user can specify a lock hold time, an amount of spins prior to blocking, spin counter settings, and the like. However, the specified parameters are typically applied globally in the application. Although the parameters are applied evenly, threads may need slightly different spin times to prevent blocking in the operating system when using objects of a specific class versus objects of another class. As a result, performance can be affected for certain classes of objects based on the global spinlock parameters.

Embodiments presented herein disclose techniques for providing spinlock parameters executing in a runtime environment. In particular, embodiments provide a data structure that is associated with each class in the application that is loaded into the runtime environment. The data structure includes configurable spinlock parameters for the class, such that when a given class is loaded into the runtime environment, any specified spinlock parameters for that class overrides default spinlock parameters for the application.

For example, the runtime environment may provide a user interface, such as a command line interface, for a user to enter class-specific spinlock parameters when launching a given application. The user may specify spinlock parameters in the command line interface for each desired class, and in turn, the runtime environment registers the specified parameters for targeted classes. The runtime environment may then monitor objects during execution of the application. When the application reaches a lock operation in the application code for an object, the runtime environment may apply any specified spinlock parameter to the objects by overriding default parameters for the spinlock.

Advantageously, embodiments presented herein provide an approach to adjust spinlock parameters for an object based on the class with which the object is associated. As a result, the techniques disclosed herein can improve runtime performance of the application in the runtime environment by tuning parameters on a class-by-class basis. For example, a user may, through a runtime lock monitor, observe trends in spinlocks associated with objects in the application and determine which spinlocks are exposed to a relatively high (or low) amount of thread activity. Based on observations, the user can tune spinlock parameters per class to account for the observed spinlock activity.

Figure 1:
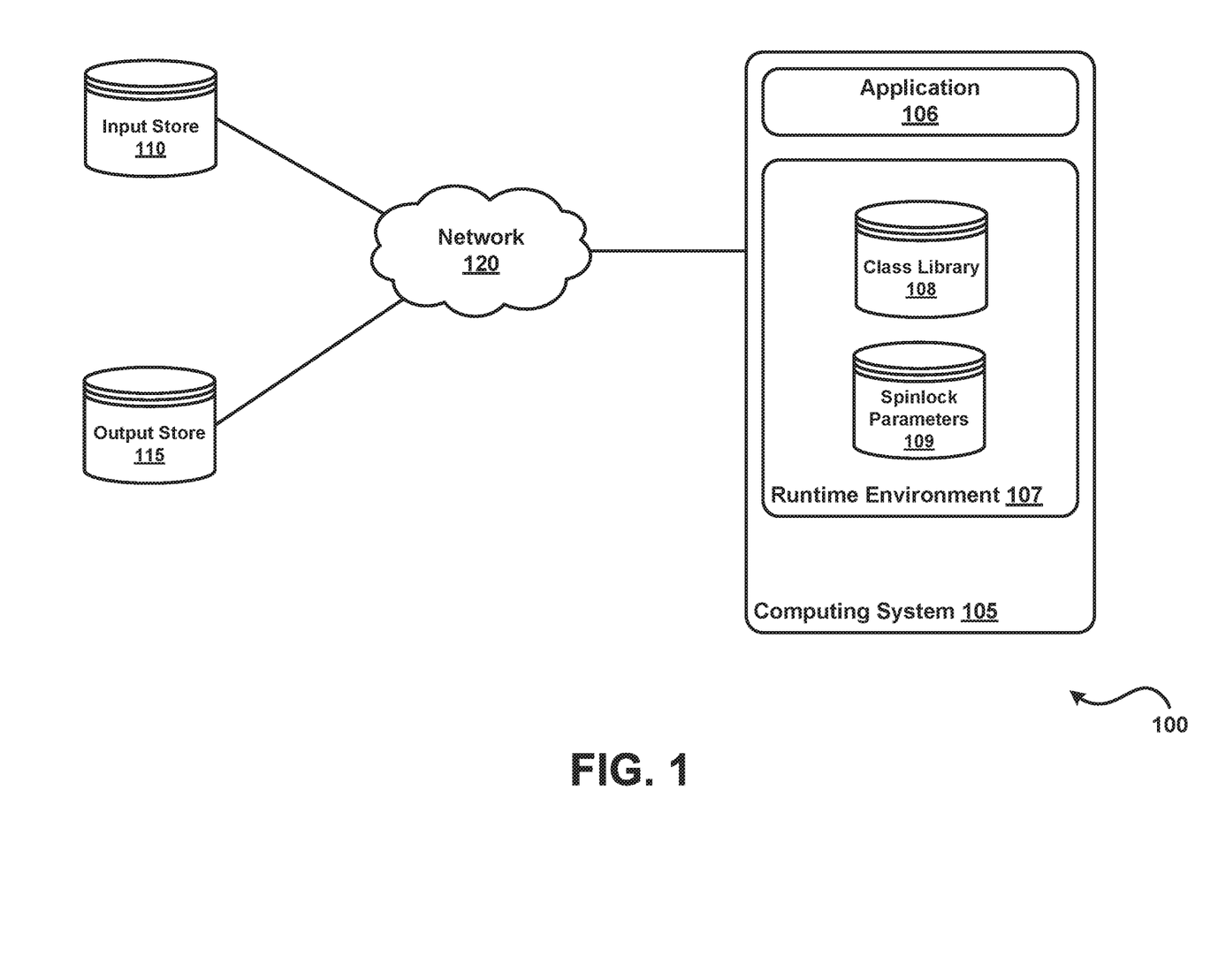
FIG. 1 illustrates an example computing environment, according to one embodiment.

FIG. 1 illustrates an example computing environment 100, according to one embodiment. As shown, the computing environment 100 includes a computing system 105, an input data store 110, and an output data store 115, each interconnected via a network 120 (e.g., the Internet). In one embodiment, the computing environment 100 represents a big data processing environment, where the computing system 105 receives data from the input data store 110, processes the data, and outputs the data to the output data store 115. Of course, embodiments may be adapted to a variety of computing environments.

In one embodiment, the computing system 105 includes an application 106 and a runtime environment 107. The runtime environment itself includes one or more class libraries 108 and spinlock parameters 109. In one embodiment, the application 106 is a multithreaded data processing application used to, in parallel, receive incoming streams of data and format the data for further processing in the output data store 115. The application 106 includes executable code that runs via the runtime environment 107. The runtime environment 107 generally provides a framework used to execute the application 106. For example, the runtime environment 107 includes a software package that has an implementation of class libraries 108 for running the application 106. In one embodiment, the application 106 is a Java application, and the runtime environment 107 corresponds to a software package providing an implementation of a Java Virtual Machine (JVM) and Java Class Library. Of course, embodiments may be adapted to various runtime environments. Further, the runtime environment 107 may provide a user interface (e.g., a command line interface) for launching the application 106 (e.g., via a script or manually entered by a user). The interface allows a command line options to be passed into the application 106 to enable and disable certain features during runtime, such as logging, input/output files, input/output directories, and the like.

As stated, the application 106 may be a multithreaded application. Typical multithreaded applications may use locking mechanisms to ensure proper access to computing resources by multiple threads of a process. For instance, the application 106 may include a number of spinlocks over shared resources (e.g., global variables) such that a given thread can access the variable without interference by other threads. Using a spinlock allows other threads to continue checking the availability of the lock as part of a busy-waiting state. In one embodiment, the runtime environment 107 uses a three-tier spinlock to prevent unnecessary blocking on short-held locks by the operating system of the computing system 107. For example, the runtime environment 107 may direct a given thread to a three-tier spin loop where the thread attempts acquiring a lock in an iterative spin loop (having a longer back-off period with each iteration), and if still locked after three spin tiers, enters a blocked state until the lock is freed.

Further, the application 106 may also use other optimizations to improve the performance of spinlocks, such as adaptive spinning, in which the application 106 identifies locks to disable based on certain thresholds, such as for an average holding time of a lock, a percentage of performance slowdown time relative to other locks, and an absolute value of slowdown relative to other locks.

In addition, the command line interface of the runtime environment 107 allows the user to specify options for spinlocks in the application 106. Example options include thresholds for spin loops at each tier for a given thread, an amount of hold time for each thread, and the like. Specified parameters can be applied globally across the entire runtime of application 106. However, doing so may result in certain locks becoming more frequently accessed in some application objects than others.

To address this issue, in one embodiment, the command line interface of the runtime environment 107 allows the spinlock parameters 109 to be specified on a per-class basis in the application 106. As will be further described below, the interface may provide an additional command line option for setting spinlock parameters. If a user includes the command line option, the user may specify spinlock parameters for a given class.

Figure 2:
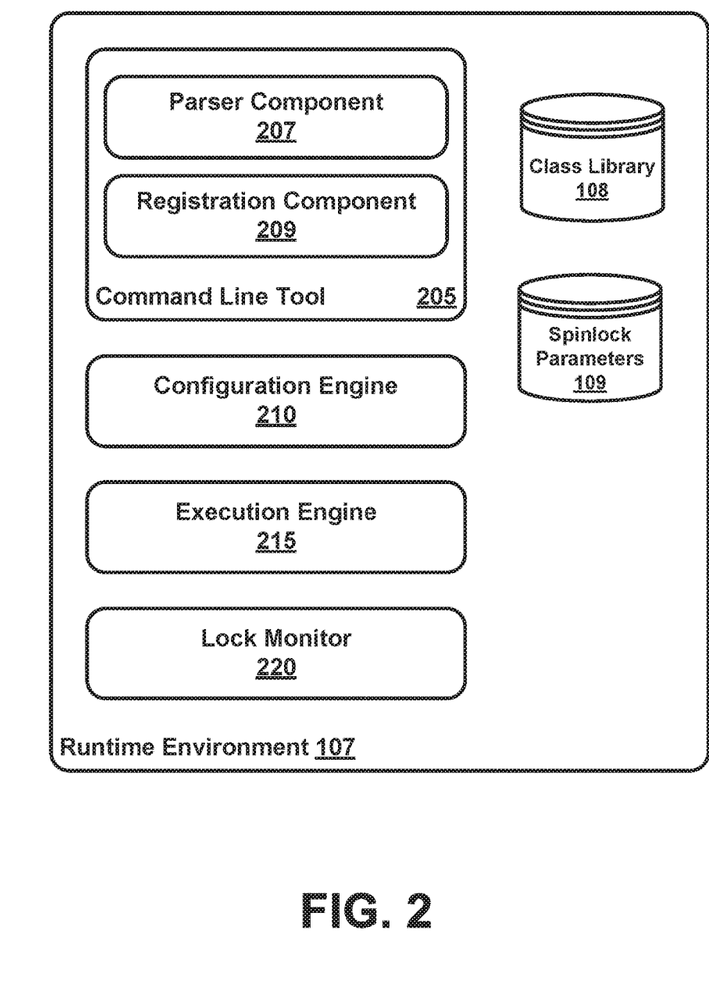
FIG. 2 further illustrates the runtime environment described relative to FIG. 1, according to one embodiment.

FIG. 2 further illustrates the runtime environment 107, according to one embodiment. In particular, FIG. 2 presents a conceptual diagram of the process steps performed by the runtime environment 107. One of skill in the art will recognize that the actual allocation of process steps in practice may vary substantially from this illustration. As shown, the runtime environment 107 includes a command line tool 205, a configuration engine 210, an execution engine 215, a lock monitor 220, the class library 108, and the spinlock parameters 109. The command line tool 205 generally provides a command line interface configured to launch the application 106 according to provided specifications (e.g., via a script or manually entered by the user).

In one embodiment, the command line tool 205 includes a parser component 207 and a registration component 209. The parser component 207 receives a command line entry from the command line interface and identifies commands, arguments, options, and option parameters. For instance, a command can specify a given instruction to execute an application and provide the name of the application as an argument. An option may include a particular feature to enable or disable in the application, and the parameters may be values used to tune the features. For example, the user may provide a command line entry to launch the application 106.

In context of the present disclosure, the parser component 207 may determine whether the command line entry includes one or more of the spinlock parameters 109 specific to a class. To do so, the parser component 207 may first identify whether the command line option corresponding to class-specific spinlock parameters is provided in the command line entry. If so, then the parser component 207 then identifies parameters and associated values following the command line option. The parser component 207 may then pass the parameters and values to the registration component 209.

In one embodiment, the registration component 209 receives the specified parameters and corresponding values from the parser component 207. In turn, the registration component 209 evaluates the received parameters and values and identifies the corresponding parameter in the runtime environment 107. The registration component 209 may then output the result to the configuration engine 210. In turn, the configuration engine 210 associates the values to the corresponding parameter in the runtime environment 107. Further, the configuration engine 210 may also apply other specified command line options provided in the command line interface.

The execution engine 215 launches the application 106 with the applied class-specific spinlock parameters 109. During runtime of the application 106, the lock monitor 220 collects metrics relating to spinlocks in each object instance in the class. Example metrics include an amount of hold time that a thread has on a given spinlock in the object, a number of attempted accesses by threads to the spinlock, a number of successful acquires, and the like. A user may observe the metrics and thereafter determine classes in which spinlock parameters should be modified.

During runtime of the application 106, the execution engine 215 may detect instances in a given object where the application invokes a function as part of a spin algorithm. In one embodiment, the function includes code for determining whether any class-specific spinlock parameters have been set previously. In such a case, the execution engine 215 may override the default parameters by using the previously set parameters.

Figure 3:
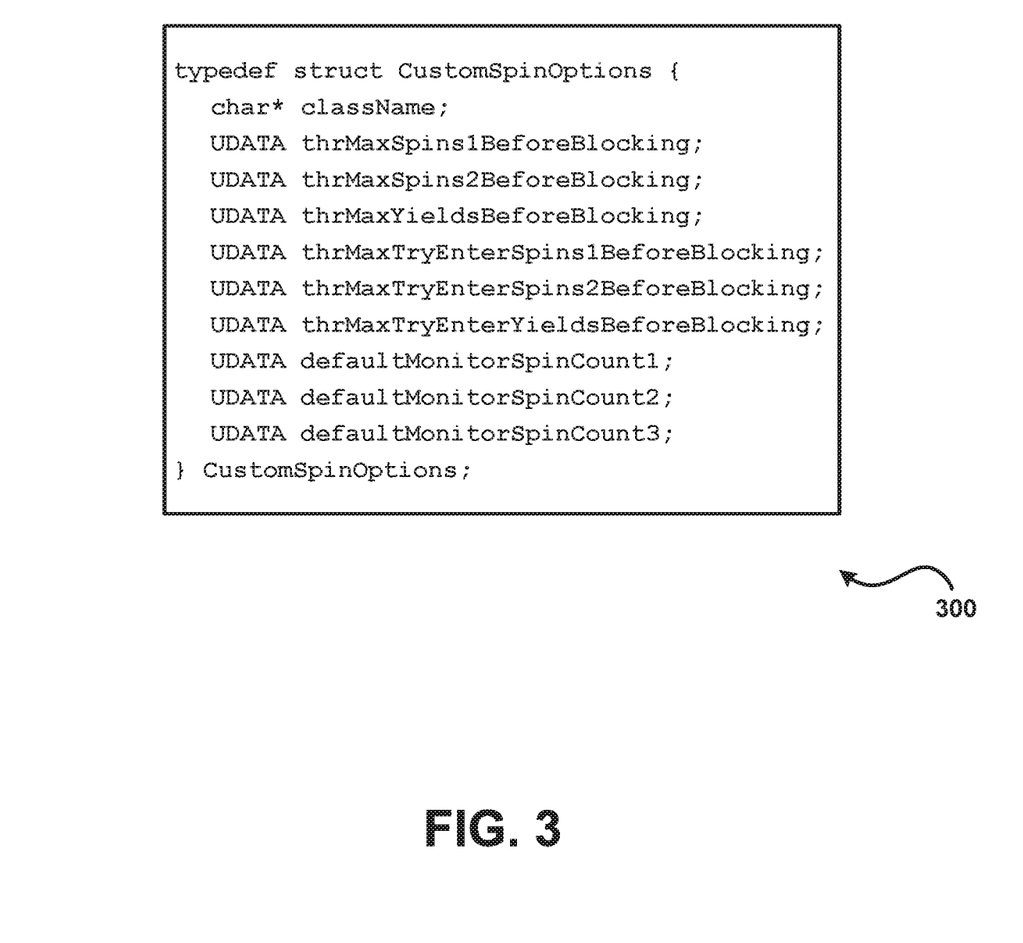
FIG. 3 illustrates an example data structure used to provide class-specific spinlock parameters, according to one embodiment.

FIG. 3 illustrates an example data structure 300, called CustomSpinOptions used to provide class-specific spinlock parameters, according to one embodiment. In one embodiment, the runtime environment 107 stores specified values for the parameters in the data structure 300. Further, the data structure 300 may be registered with each class of the application 106 at runtime of the application 106.

Illustratively, the data structure 300 stores a className character string corresponding to the name of a particular class to be associated with the class-specific spinlock parameters. Below className are UDATA objects corresponding to the spinlock parameters for that particular class. For example, thrMaxSpins1BeforeBlocking, thrMaxSpins2BeforeBlocking, and thrMaxYieldsBeforeBlocking are directed to spinlock parameters for flat locks (i.e., in a scenario where the spinlock is not contended). The parameters of thrMaxTryEnterSpins1BeforeBlocking, thrMaxTryEnterSpins2BeforeBlocking, and thrMaxTryEnterYieldsBeforeBlocking are directed to spinlock parameters for inflated locks (i.e., in a scenario where a spinlock is contended). Generally, the aforementioned parameters relate to metrics observed by the lock monitor 220. Further, the parameters of defaultMonitorSpinCount1, defaultMonitorSpinCount2, and defaultMonitorSpinCount3 are directed to heavyweight locks. These three parameters generally relate to metrics observed in a monitor on the computing system 105.

As stated, the user may specify spinlock parameters for a given class via the command line interface provided by the runtime environment 107. For instance, in the case that the runtime environment 107 includes a Java Virtual Machine implementation, a format for the command line option for providing a spinlock parameter for a class can resemble:
-Xthr:customSpinOptions=className:
 thrMaxSpins1BeforeBlocking:
 thrMaxSpins2BeforeBlocking:thrMaxYieldsBeforeBlocking:thrMaxTryEnterSpins1BeforeBlocking:
 thrMaxTryEnterSpins2BeforeBlocking:
 thrMaxTryEnterYieldsBeforeBlocking:
 threeTierSpinCount1:threeTierSpinCount2:
 threeTierSpinCount3

A user may provide an entry to the command line interface with the customSpinOptions command line option to set class-specific parameters for the application 106. For example, the user may provide the entry as shown below:

Java  -Xthr:customSpinOptions=java/util/Hashtable:100: 101:102:103:104:105:106:107:108-version In such a case, the user has submitted values (e.g., 100, 101, 102, and so on) for the respective spinlock parameters discussed above. The parsing component 207 identifies the values and the registration component 209 associates those values to the corresponding parameters in the runtime environment 105. Once associated, the execution engine 215 may override default parameters for a spinlock in an object of the specified class during runtime of the application 106.

Of course, the parameters described above should not be considered as limiting. One of skill in the art will recognize that additional parameters may be specified on a per-class basis for spinlocks in a given application executing in the runtime environment 107. For example, class-specific parameters may be provided for adaptive spinning algorithms used in the runtime environment 107 for the application. For instance, the runtime environment 107 may provide a parameter for toggling adaptive spinning for each spinlock for a class. Parameters can also include a holding period on a spinlock, percentage thresholds for performance slowdown relative to other locks, and amount thresholds for slowdown relative to other locks.

Figure 4:
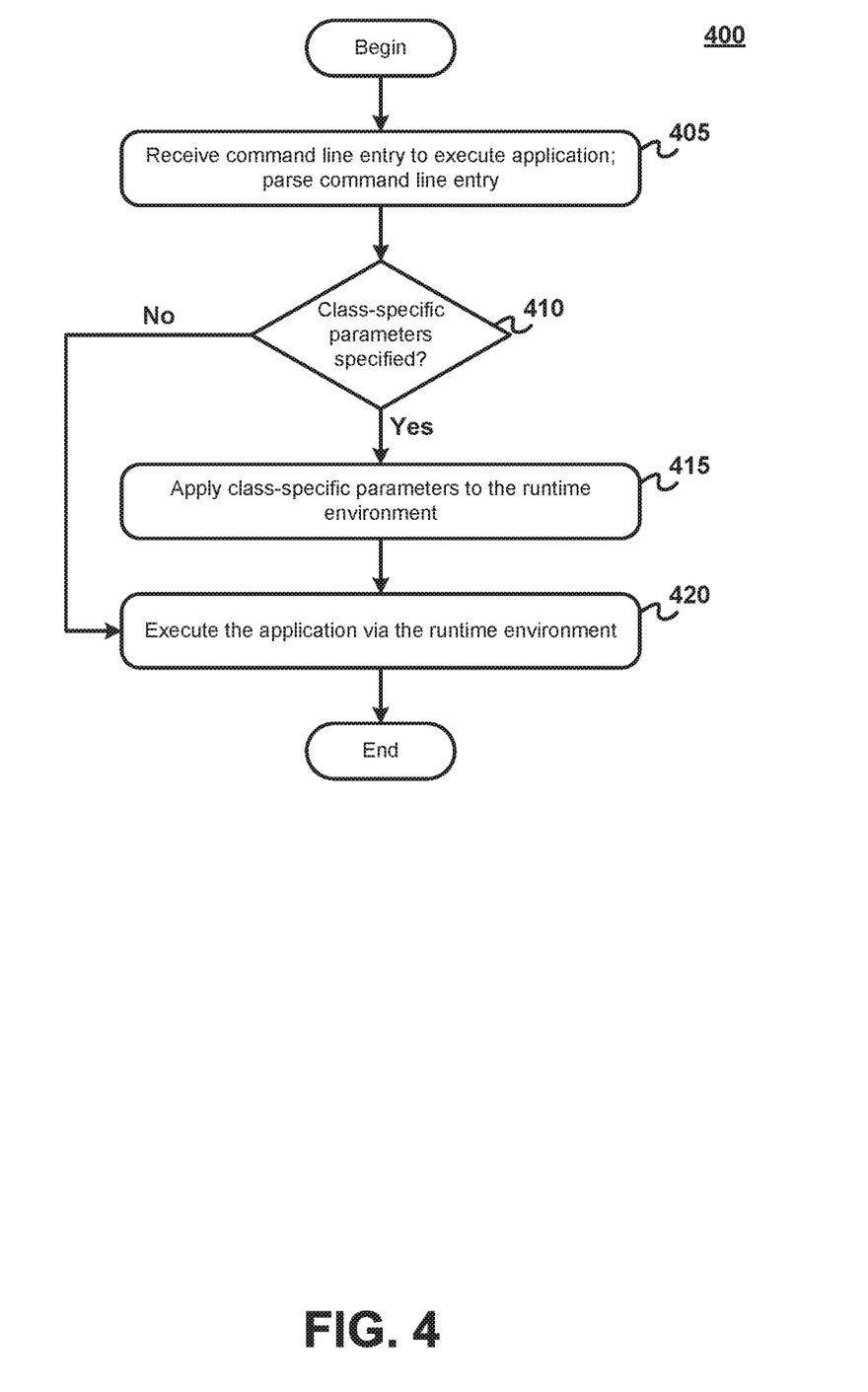
FIG. 4 illustrates a method for registering class-specific spinlock parameters for an application executing in a runtime environment, according to one embodiment.

FIG. 4 illustrates a method 400 for registering class-specific spinlock parameters for an application executing in a runtime environment, according to one embodiment. At step 405, the parser component 207 receives a command line entry for executing an application, such as the application 106. The parser component 207 evaluates and tokenizes the command line entry.

At step 410, the parser component 207 determines whether class-specific parameters are specified. For instance, the parser component 207 may identify whether any of the tokens provided in the command line entry correspond to a command line option for specifying class-specific parameters. The parser component 207 may also evaluate whether the command line option and supplied parameters are properly formed.

If the command line entry specifies class-specific spinlock parameters, then at step 415, the registration component 209 applies the specified class-specific parameters to the runtime environment. To do so, the registration component 209 may identify the class specified by the user, e.g., in one of the arguments provided for the command line option. The registration component 209 may then determine whether the class corresponds to a valid class in the application 106. If not, then the command line tool 205 may return an error. However, if so, then the registration component 209 may take, as input, the values provided in the command line entry and store the values in corresponding parameters in the class data structure.

At step 420, the execution engine 215 launches the application 106 in the runtime environment 107 according to the parameters specified in the command line interface. Further, the execution engine 215 may instantiate the lock monitor 220, which begins observing thread activity in spinlocks of each object in the application 106 during runtime.

Figure 5:
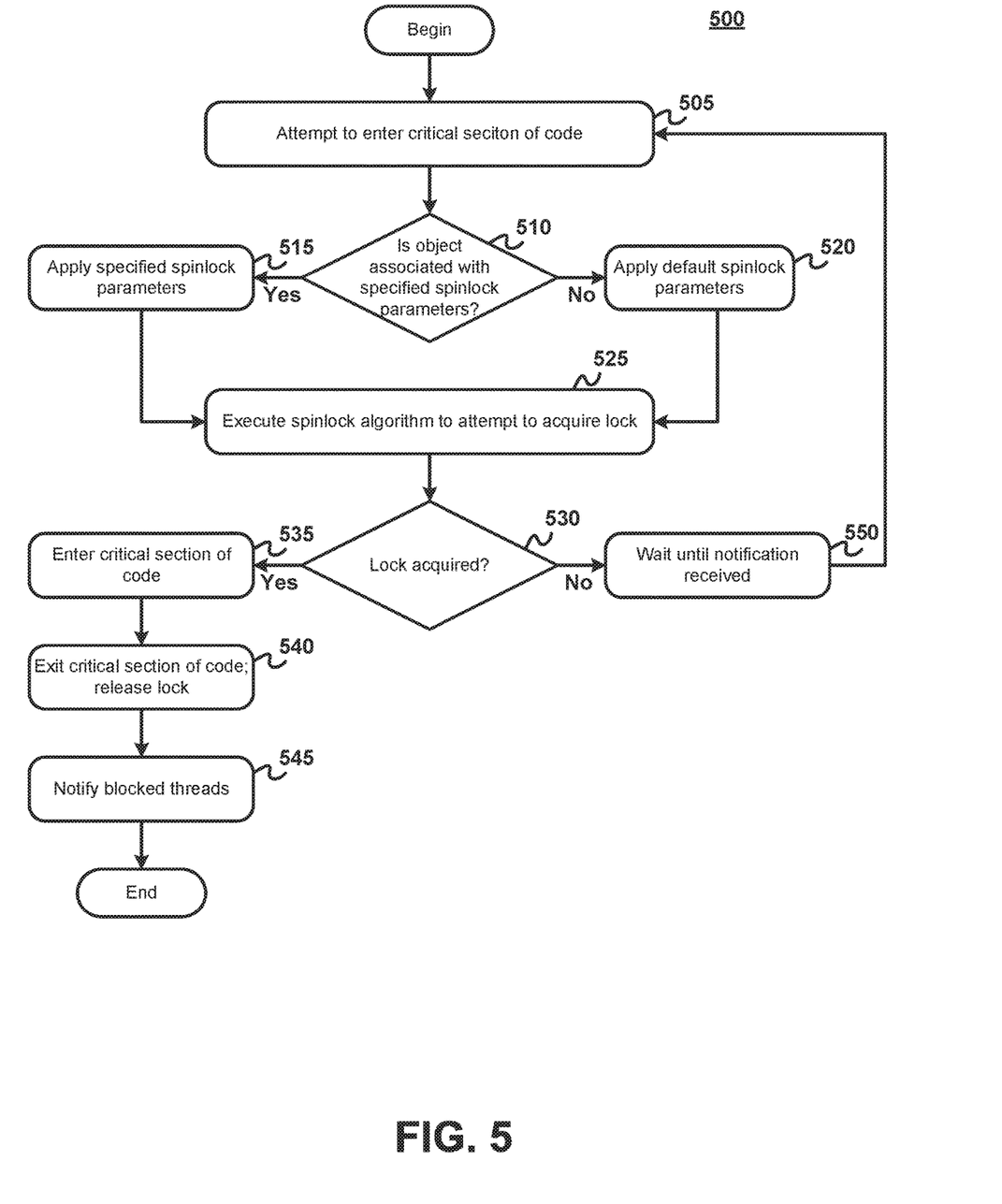
FIG. 5 illustrates a method for applying class-specific spinlock parameters in an application executing in a runtime environment, according to one embodiment.

FIG. 5 illustrates a method 500 for applying class-specific spinlock parameters in an application executing in a runtime environment, according to one embodiment. Method 500 relates to the perspective of the runtime environment 107 during execution of the application 106. In particular, method 500 describes the process that takes place when an object in the application 106 enters a blocking portion of the code. In such a case, the application 106 invokes a function to carry out a spinlock algorithm.

As shown, method 500 begins at step 505, where a thread attempts to enter a critical section of code in the application 106. At step 510, the execution engine 215 determines whether the underlying class of the object is associated with specified spinlock parameters. To do so, the execution engine 215 may evaluate the data structure in the object storing spinlock parameters.

If the parameters are modified, then at step 515, the execution engine 215 overrides the present global settings for the spinlock for that object and applies the specified spinlock parameters. For example, for a given class, a user may specify a given value for an amount of maximum thread spins on a lock prior to blocking the thread. The execution engine 215 may override the default value for that amount when the blocking portion of code is reached in the application 106. If no overriding class-specific parameters are set, then at step 520, the execution engine 215 continues with the default spinlock parameters. At step 525, the thread then performs the spinlock algorithm.

At step 530, the executing engine 215 determines whether a lock is acquired. If so, then at step 535, the thread enters the critical section of code, while other requesting threads are blocked by the operating system and wait for a notification that the lock is released. The thread then executes its code within the critical section. When the thread has completed executing the code within the critical section, then at step 540, the thread exits the critical section of code. Further, at step 545, the execution engine 215 notifies blocked threads.

If the executing engine 215 determines that the lock is not acquired, then at step 550, the thread waits until a notification that the lock is released is received. Once the notification is received, the method returns to step 505.

Figure 6:
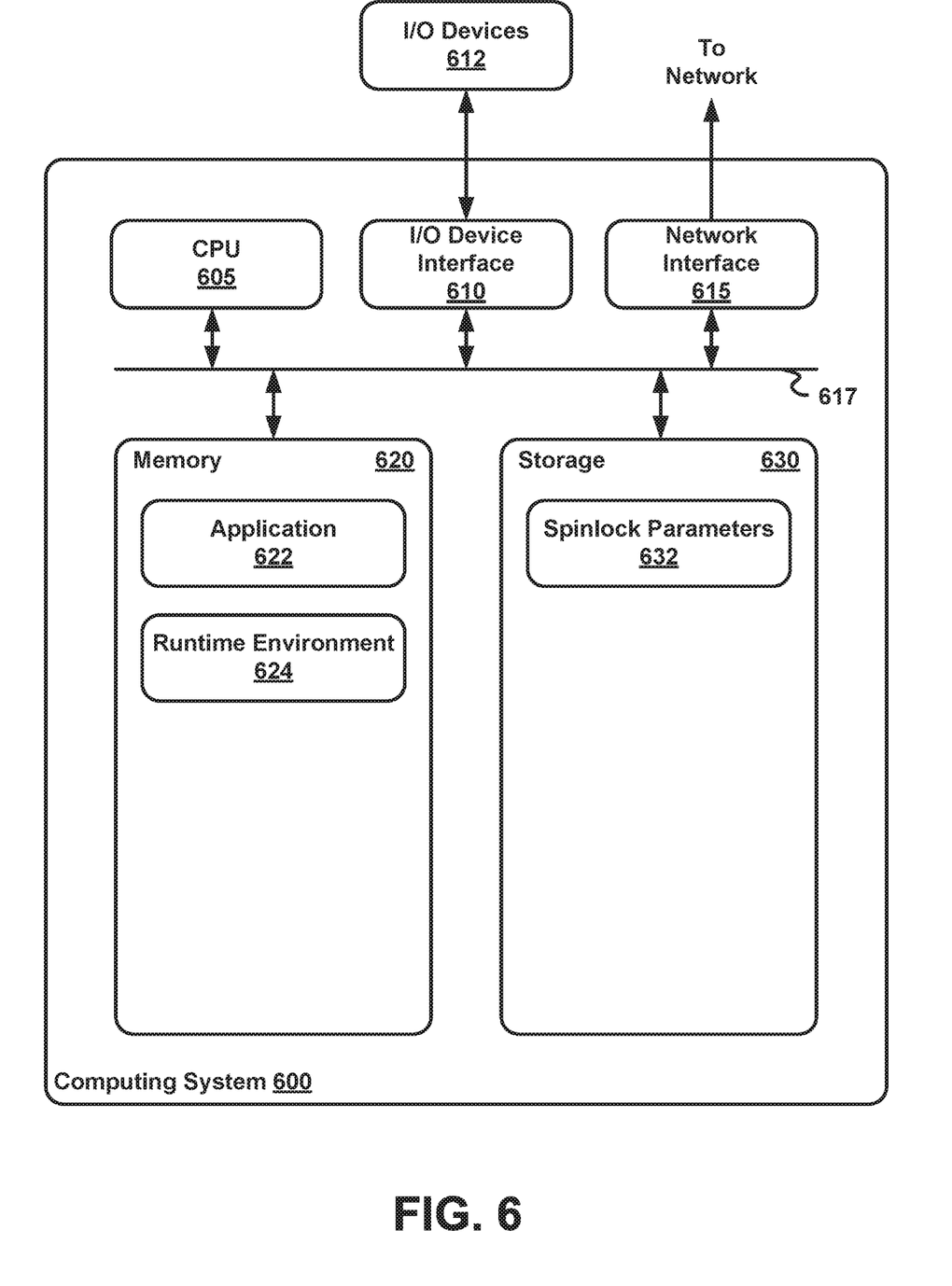
FIG. 6 illustrates an example computing system configured to provide class-specific spinlock parameters in an application executing in a runtime environment, according to one embodiment.

FIG. 6 illustrates an example computing system configured to provide class-specific spinlock parameters in an application executing in a runtime environment, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application 622 and a runtime environment 624 that executes the application 622. Storage 630 includes one or more spinlock parameters 632. The runtime environment 624 provides a framework that allows the application 622 to run on the computing system 600. Further, the runtime environment 624 may provide a user interface (e.g., a command line interface) through which a user provides an entry for launching the application 622 on the computing system 600. In one embodiment, the runtime environment 624 receives specifications of one or more of the class-specific spinlock parameters 632 to modify spinlock and thread behavior relating to spinlocks in the application 622. The runtime environment 624 may apply the spinlock parameters 632 by storing the parameter values in a data structure for a given class. As a result, the runtime environment 624 may override default spinlock parameters for the application 622. For example, the runtime environment 624 may replace a default waiting period for threads attempting to acquire a spinlock at a given tier with a waiting period specified in the interface.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the runtime environment or related data available in the cloud. For example, the runtime environment could execute on a computing system in the cloud and provide class-specific spinlock parameters for an application executing in the runtime environment. In such a case, the runtime environment could register specified spinlock parameters for a class and store the specified values in a data structure for a given class object. Further, the runtime environment may store spinlock parameter information regarding each class in a storage location in the cloud. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method comprising:
    during execution of an application in a runtime environment, entering, by a first thread, a first blocking portion of code for a first object in the application, wherein the first object is associated with a first class of a plurality of classes;
    determining that a first plurality of class-specific spinlock parameters is enabled for the first class, wherein the first plurality of class-specific spinlock parameters include a first maximum spin value, a second maximum spin value, and a third maximum spin value, wherein the first, second, and third maximum spin values define a maximum number of times the first thread can spin while attempting to acquire a lock, and wherein the second maximum spin value is relatively higher than the first maximum spin value and relatively lower than the third maximum spin value;
    determining that the first plurality of class-specific spinlock parameters is enabled for the first object, based on determining (i) that the first plurality of class-specific spinlock parameters is associated with the first class, and (ii) that the first object belongs to the first class;
    upon determining that the first plurality of class-specific spinlock parameters is enabled for the first object, applying the first plurality of class-specific spinlock parameters to the first object;
    performing a first spinlock algorithm using the applied first plurality of class-specific spinlock parameters, wherein the first spinlock algorithm includes a plurality of spin tiers, and wherein performing the first spinlock algorithm comprises:
        performing a first spin tier by iteratively attempting to acquire the lock until a first number of attempts matches the first maximum spin value;
        after waiting for a first predefined period of time, performing a second spin tier by iteratively attempting to acquire the lock until a second number of attempts matches the second maximum spin value;
        after waiting for a second predefined period of time, performing a third spin tier by iteratively attempting to acquire the lock until a third number of attempts matches the third maximum spin value; and
        upon failing to acquire the lock after the first, second, and third spin tiers are completed, blocking the first thread;
    collecting a first set of class-specific statistics related to the performance of the first spinlock algorithm for the first class, wherein the first set of class-specific statistics comprise (i) an amount of hold time that a thread has on a first spinlock for an object in the first class, (ii) a number of attempted accesses by threads to the first spinlock, and (iii) a number of successful acquires for the first spinlock;
    entering, by the first thread, a second blocking portion of code for a second object in the application, wherein the second object is associated with a second class of the plurality of classes;
    determining that a second plurality of class-specific spinlock parameters is enabled for the second class, wherein the second plurality of class-specific spinlock parameters include an indication that adaptive spinning is enabled for the second class;
    determining that the second plurality of class-specific spinlock parameters is enabled for the second object, based on determining that (i) the second plurality of class-specific spinlock parameters is associated with the second class, and (ii) the second object belongs to the second class;
    performing a second spinlock algorithm using the second plurality of class-specific spinlock parameters, comprising blocking the first thread upon determining that a fourth maximum spin value has been exceeded;
    collecting a second set of class-specific statistics distinct from the first set of class-specific statistics and related to the performance of the second spinlock algorithm for the second class, wherein the second set of class-specific statistics comprise (i) an amount of hold time that a thread has on a second spinlock for an object in the second class, (ii) a number of attempted accesses by threads to the second spinlock, and (iii) a number of successful acquires for the second spinlock;
    disabling the second spinlock algorithm for the second object, based on determining that adaptive spinning is enabled for the second class, and based further on determining that the second set of class-specific statistics meet predefined criteria;
    providing, to a user, the first and second sets of class-specific statistics; and
    receiving a modified first plurality of class-specific spinlock parameters, wherein the second plurality of class-specific spinlock parameters remain unmodified.

2. The method of claim 1, wherein determining that the first plurality of class-specific spinlock parameters is enabled for the first class comprises:
    evaluating a data structure storing the first plurality of class-specific spinlock parameters for the first class.

3. The method of claim 1, further comprising:
    upon determining that a third plurality of class-specific spinlock parameters is not enabled for a third object, applying a default spinlock parameter to the third object.

4. The method of claim 1, further comprising, prior to entering the first blocking portion of code:
    receiving a specification of the first plurality of class-specific spinlock parameters for at least the first class of the plurality of classes.

5. The method of claim 4, wherein the specification is received via a command line interface.

6. The method of claim 4, further comprising:
    associating the specified first plurality of class-specific spinlock parameters with the first class.

7. The method of claim 1, wherein the first spinlock algorithm is an adaptive spinning algorithm, and wherein a third class-specific spinlock parameter is a parameter for tuning the adaptive spinning algorithm.

8. A computer program product, comprising:
a computer readable storage medium storing instructions, which, when executed on a processor, perform an operation, comprising:
- during execution of an application in a runtime environment by a first thread, a first blocking portion of code for a first object in the application, wherein the first object is associated with a first class of a plurality of classes;
- determining that a first plurality of class-specific spinlock parameters is enabled for the first class, wherein the first plurality of class-specific spinlock parameters include a first maximum spin value, a second maximum spin value, and a third maximum spin value, wherein the first, second, and third maximum spin values define a maximum number of times the first thread can spin while attempting to acquire a lock, and wherein the second maximum spin value is relatively higher than the first maximum spin value and relatively lower than the third maximum spin value;
- determining that the first plurality of class-specific spinlock parameters is enabled for the first object, based on determining that (i) the first plurality of class-specific spinlock parameters is associated with the first class, and (ii) the first object belongs to the first class;
- upon determining that the first plurality of class-specific spinlock parameters is enabled for the first object, applying the first plurality of class-specific spinlock parameters to the first object;
- performing a first spinlock algorithm using the applied first plurality of class-specific spinlock parameters, wherein the first spinlock algorithm includes a plurality of spin tiers, and wherein performing the first spinlock algorithm comprises:
  - performing a first spin tier by iteratively attempting to acquire the lock until a first number of attempts matches the first maximum spin value;
  - after waiting for a first predefined period of time, performing a second spin tier by iteratively attempting to acquire the lock until a second number of attempts matches the second maximum spin value;
  - after waiting for a second predefined period of time, performing a third spin tier by iteratively attempting to acquire the lock until a third number of attempts matches the third maximum spin value; and
  - upon failing to acquire the lock after the first, second, and third spin tiers are completed, blocking the first thread;
- collecting a first set of class-specific statistics related to the performance of the first spinlock algorithm for the first class, wherein the first set of class-specific statistics comprise (i) an amount of hold time that a thread has on a first spinlock for an object in the first class, (ii) a number of attempted accesses by threads to the first spinlock, and (iii) a number of successful acquires for the first spinlock;
- entering, by the first thread, a second blocking portion of code for a second object in the application, wherein the second object is associated with a second class of the plurality of classes;
- determining that a second plurality of class-specific spinlock parameters is enabled for the second class, wherein the second plurality of class-specific spinlock parameters include an indication that adaptive spinning is enabled for the second class;
- determining that the second plurality of class-specific spinlock parameters is enabled for the second object, based on determining that (i) the second plurality of class-specific spinlock parameters is associated with the second class, and (ii) the second object belongs to the second class;
- performing a second spinlock algorithm using the second plurality of class-specific spinlock parameters, comprising blocking the first thread upon determining that a fourth maximum spin value has been exceeded;
- collecting a second set of class-specific statistics distinct from the first set of class-specific statistics and related to the performance of the second spinlock algorithm for the second class, wherein the second set of class-specific statistics comprise (i) an amount of hold time that a thread has on a second spinlock for an object in the second class, (ii) a number of attempted accesses by threads to the second spinlock, and (iii) a number of successful acquires for the second spinlock;
- disabling the second spinlock algorithm for the second object, based on determining that adaptive spinning is enabled for the second class, and based further on determining that the second set of class-specific statistics meet predefined criteria;
- providing, to a user, the first and second sets of class-specific statistics; and
- receiving a modified first plurality of class-specific spinlock parameters, wherein the second plurality of class-specific spinlock parameters remain unmodified.

9. The computer program product of claim 8, wherein determining that the first plurality of class-specific spinlock parameters is enabled for the first class comprises:
- evaluating a data structure storing the first plurality of class-specific spinlock parameters for the first class.

10. The computer program product of claim 8, wherein the operation further comprises:
- upon determining that a third plurality of spinlock parameters is not enabled for a third object, applying a default spinlock parameter to the third object.

11. The computer program product of claim 8, wherein the operation further comprises, prior to entering the first blocking portion of code:
- receiving a specification of the first plurality of class-specific spinlock parameters for at least the first class of the plurality of classes.

12. The computer program product of claim 11, wherein the specification is received via a command line interface.

13. The computer program product of claim 11, wherein the operation further comprises:
- associating the specified first plurality of class-specific spinlock parameters with the first class.

14. The computer program product of claim 8, wherein the first spinlock algorithm is an adaptive spinning algorithm, and wherein a third class-specific spinlock parameter is a parameter for tuning the adaptive spinning algorithm.

15. A system, comprising:
a processor; and
a memory storing program code, which, when executed on the processor, performs an operation, comprising:
- during execution of an application in a runtime environment, entering, by a first thread, a first blocking portion of code for a first object in the application, wherein the first object is associated with a first class of a plurality of classes;

determining that a first plurality of class-specific spinlock parameters is enabled for the first class, wherein the first plurality of class-specific spinlock parameters include a first maximum spin value, a second maximum spin value, and a third maximum spin value, wherein the first, second, and third maximum spin values define a maximum number of times the first thread can spin while attempting to acquire a lock, and wherein the second maximum spin value is relatively higher than the first maximum spin value and relatively lower than the third maximum spin value;

determining that the first plurality of class-specific spinlock parameters is enabled for the first object, based on determining that (i) the first plurality of class-specific spinlock parameters is associated with the first class, and (ii) the first object belongs to the first class;

upon determining that the first plurality of class-specific spinlock parameters is enabled for the first object, applying the first plurality of class-specific spinlock parameters to the first object;

performing a first spinlock algorithm using the applied first plurality of class-specific spinlock parameters, wherein the first spinlock algorithm includes a plurality of spin tiers, and wherein performing the first spinlock algorithm comprises:

performing a first spin tier by iteratively attempting to acquire the lock until a first number of attempts matches the first maximum spin value;

after waiting for a first predefined period of time, performing a second spin tier by iteratively attempting to acquire the lock until a second number of attempts matches the second maximum spin value;

after waiting for a second predefined period of time, performing a third spin tier by iteratively attempting to acquire the lock until a third number of attempts matches the third maximum spin value; and upon failing to acquire the lock after the first, second, and third spin tiers are completed, blocking the first thread;

collecting a first set of class-specific statistics related to the performance of the first spinlock algorithm for the first class, wherein the first set of class-specific statistics comprise (i) an amount of hold time that a thread has on a first spinlock for an object in the first class, (ii) a number of attempted accesses by threads to the first spinlock, and (iii) a number of successful acquires for the first spinlock;

entering, by the first thread, a second blocking portion of code for a second object in the application, wherein the second object is associated with a second class of the plurality of classes;

determining that a second plurality of class-specific spinlock parameters is enabled for the second class, wherein the second plurality of class-specific spinlock parameters include an indication that adaptive spinning is enabled for the second class;

determining that the second plurality of class-specific spinlock parameters is enabled for the second object, based on determining that (i) the second plurality of class-specific spinlock parameters is associated with the second class, and (ii) the second object belongs to the second class;

performing a second spinlock algorithm using the second plurality of class-specific spinlock parameters, comprising blocking the first thread upon determining that a fourth maximum spin value has been exceeded;

collecting a second set of class-specific statistics distinct from the first set of class-specific statistics and related to the performance of the second spinlock algorithm for the second class, wherein the second set of class-specific statistics comprise (i) an amount of hold time that a thread has on a second spinlock for an object in the second class, (ii) a number of attempted accesses by threads to the second spinlock, and (iii) a number of successful acquires for the second spinlock;

disabling the second spinlock algorithm for the second object, based on determining that adaptive spinning is enabled for the second class, and based further on determining that the second set of class-specific statistics meet predefined criteria;

providing, to a user, the first and second sets of class-specific statistics; and receiving a modified first plurality of class-specific spinlock parameters, wherein the second plurality of class-specific spinlock parameters remain unmodified.

16. The system of claim 15, wherein determining that the first plurality of class-specific spinlock parameters is enabled for the first class comprises:
evaluating a data structure storing the first plurality of class-specific spinlock parameters for the first class.

17. The system of claim 15, wherein the operation further comprises:
upon determining that a third plurality of class-specific spinlock parameters is not enabled for a third object, applying a default spinlock parameter to the third object.

18. The system of claim 15, wherein the operation further comprises, prior to entering the first blocking portion of code:
receiving a specification of the first plurality of class-specific spinlock parameters for at least the first class of the plurality of classes.

19. The system of claim 18, wherein the operation further comprises:
associating the specified first plurality of class-specific spinlock parameters with the first class.

20. The system of claim 15, wherein the first spinlock algorithm is an adaptive spinning algorithm, and wherein a third class-specific spinlock parameter is a parameter for tuning the adaptive spinning algorithm.

* * * * *